US010222665B2

(12) United States Patent
Xu et al.

(10) Patent No.: US 10,222,665 B2
(45) Date of Patent: Mar. 5, 2019

(54) ARRAY SUBSTRATE AND DRIVING METHOD FOR THE SAME, DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Rui Xu, Beijing (CN); Xue Dong, Beijing (CN); Xiaochuan Chen, Beijing (CN); Lei Wang, Beijing (CN); Jinghua Miao, Beijing (CN); Ming Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 404 days.

(21) Appl. No.: 15/159,112

(22) Filed: May 19, 2016

(65) Prior Publication Data

US 2017/0003541 A1    Jan. 5, 2017

(30) Foreign Application Priority Data

Jul. 3, 2015    (CN) .......................... 2015 1 0389167

(51) Int. Cl.
  *G09G 3/36*    (2006.01)
  *G02F 1/1345*    (2006.01)

(52) U.S. Cl.
  CPC ....... *G02F 1/13454* (2013.01); *G09G 3/3648* (2013.01); *G02F 2001/13456* (2013.01);
  (Continued)

(58) Field of Classification Search
None
See application file for complete search history.

(56) References Cited

U.S. PATENT DOCUMENTS

2006/0028414 A1*  2/2006 Kimura ................. G09G 3/006
                                            345/87
2015/0002379 A1   1/2015 Kim
2016/0275862 A1*  9/2016 Riedel ...................... G09G 3/20

FOREIGN PATENT DOCUMENTS

CN    102621758 A    8/2012
CN    103927970 A    7/2014
(Continued)

OTHER PUBLICATIONS

First Office Action dated Mar. 8, 2017 in corresponding Chinese Patent Application No. 201510389167.6.

*Primary Examiner* — Carl Adams
(74) *Attorney, Agent, or Firm* — Nath, Goldberg & Meyer; Joshua B. Goldberg; Daniel Bising

(57) ABSTRACT

The present invention provides an array substrate and a driving method for the same, and a display device. The array substrate comprises pixel units arranged in an array in a display area, a plurality of gate lines and a plurality of data lines, each of the gate lines is connected to a respective row of pixel units, each of the data lines is connected to a respective column of pixel units, the array substrate further comprises a first driving circuit provided in a non-display area outside one side of the display area, the first driving circuit is connected to each of the gate lines and each of the data lines respectively, for providing driving signals to the gate lines and the data lines.

10 Claims, 4 Drawing Sheets

(52) U.S. Cl.
CPC ............... *G09G 2300/0408* (2013.01); *G09G 2300/0426* (2013.01); *G09G 2310/0281* (2013.01)

(56) References Cited

FOREIGN PATENT DOCUMENTS

| | | | |
|---|---|---|---|
| CN | 104112432 A | 10/2014 | |
| CN | 104751766 A | 7/2015 | |

\* cited by examiner

ARRAY SUBSTRATE AND DRIVING METHOD FOR THE SAME, DISPLAY DEVICE

FIELD OF THE INVENTION

The present invention relates to the field of display technology, and particularly, relates to an array substrate and a driving method for the same, and a display device.

BACKGROUND OF THE INVENTION

With development of display technology, high quality display devices require more and more narrow borders, and high-end display devices (such as wearable displays, special-shaped displays equipped on a dashboard in a car, etc.) are in pursuit of ultra-narrow borders and even no borders.

Traditional display devices (for example, a phone) are provided with a display panel as shown in FIG. 1, a driving chip 7 is provided in anon-display area on one side edge of the display panel, for providing scan driving signals and data driving signals to pixels provided in a display area. Non-display areas on other side edges of the display panel require to be provided with scan signal lines 8 for transmitting scan driving signals, resulting in that the display panel cannot achieve ultra-narrow borders or no borders at multiple sides thereof.

In addition, some special-shaped display panels also require some control chips, for controlling outputs of the scan driving signals, to be provided in non-display areas on multiple side edges thereof. For example, a clock control chip is provided in non-display areas on multiple side edges of the special-shaped display panel for controlling real-time outputs of the scan driving signals, so as to complete driving of the entire display panel, which also results in that the display panel cannot achieve ultra-narrow borders or no borders at multiple sides thereof.

SUMMARY OF THE INVENTION

An object of the present invention is directed against above technical problems existing in the prior art to provide an array substrate and a driving method for the same, and a display device. A first driving circuit is provided in a non-display area outside one side of a display area of the array substrate to drive all of gate lines and data lines on the array substrate, thus wiring on multiple sides of the array substrate is avoided, so that the array substrate can achieve no borders on sides thereof, other than the side provided with the first driving circuit, and can achieve a narrow border on the side provided with the first driving circuit.

In order to achieve above object, the present invention provides an array substrate, comprising pixel units arranged in an array in a display area, a plurality of gate lines and a plurality of data lines, each of the gate lines is connected to a respective row of pixel units, each of the data lines is connected to a respective column of pixel units, the array substrate further comprises a first driving circuit provided in a non-display area outside one side of the display area, the first driving circuit is connected to each of the gate lines and each of the data lines respectively, for providing driving signals to the gate lines and the data lines.

Preferably, the first driving circuit comprises a plurality of sub-circuits with identical compositions and structures, each of the sub-circuits is connected to one of the gate lines and two of the data lines, and is configured to provide a scan driving signal to the respective one of the gate lines and provide a data driving signal to the respective two of the data lines.

Preferably, the number of the sub-circuits is the same as that of the gate lines, and is half of that of the data lines.

Preferably, the sub-circuit comprises a data signal line, a first control signal line, a second control signal line, a third control signal line, a first transistor, a second transistor, a third transistor and a capacitor;

a gate of the first transistor is connected to the first control signal line, a first electrode of the first transistor is connected to the data signal line, a second electrode of the first transistor is connected to a first terminal of the capacitor, and a second terminal of the capacitor is correspondingly connected to the one of the gate lines;

a gate of the second transistor is connected to the second control signal line, a first electrode of the second transistor is connected to the data signal line, a second electrode of the second transistor is correspondingly connected to the data line adjacent thereto, a gate of the third transistor is connected to the third control signal line, a second electrode of the third transistor is connected to the data signal line, and a first electrode of the third transistor is correspondingly connected to the data line adjacent thereto.

Preferably, the array substrate further comprises a data driving circuit, the data driving circuit and the first driving circuit are provided in the non-display area outside the same side of the display area;

the data signal line, the first control signal line, the second control signal line and the third control signal line are connected to the data driving circuit, the data driving circuit is configured to provide a data driving signal to the data signal line, and provide a control driving signal to the first control signal line, the e second control signal line and the third control signal line.

Alternatively, the array substrate further comprises a data driving circuit and a peripheral circuit, the data driving circuit and the first driving circuit are provided in the non-display area outside the same side of the display area, and the peripheral circuit is provided outside the array substrate;

the first control signal line, the second control signal line and the third control signal line are connected to the peripheral circuit, the peripheral circuit is configured to provide a control driving signal to the first control signal line, the second control signal line and the third control signal line; the data signal line is connected to the data driving circuit, the data driving circuit is configured to provide a data driving signal to the data signal line.

The present invention also provides a display device comprising the above array substrate.

The present invention also provides a driving method for the above array substrate, comprising: driving the gate lines one by one through the first driving circuit, during driving any of the gate lines, the first driving circuit first drives half of pixel units in the row of pixel units corresponding to the gate line, and then drives the other half of pixel units in the row of pixel units.

Preferably, in a procedure of driving any of the gate lines, the first driving circuit first drives odd numbered pixel units in the row of pixel units corresponding to the gate line, and then drives even numbered pixel units in the row of pixel units.

Alternatively, in a procedure of driving any of the gate lines, the first driving circuit may first drive even numbered pixel units in the row of pixel units corresponding to the gate line, and then drive odd numbered pixel units in the row of pixel units.

Preferably, the procedure of driving any of the gate lines comprises:

a first stage, in which a high level signal is inputted through the first control signal line, the first transistor is turned on, the capacitor is charged by the data driving signal inputted through the data signal line, and after completion of charging, a voltage of the corresponding gate line becomes a high level, switching elements in the row of pixels units corresponding to the gate line are switched on, and the voltage of the gate line is maintained at the high level by the capacitor in subsequent second and third stages;

a second stage, in which a low level signal is inputted through the first control signal line, the first transistor is turned off, the high level signal is inputted through the second control signal line, the second transistor is turned on, and sub-pixels in odd numbered or even numbered pixel units correspondingly illuminate light by driving of the data driving signal inputted through the data signal line;

a third stage, in which the low level signal is inputted through the first control signal line, the first transistor is turned off, the low level signal is inputted through the second control signal line, the second transistor is turned off, the high level signal is inputted through the third control signal line, the third transistor is turned on, and sub-pixels in even numbered or odd numbered pixel units correspondingly illuminate light by driving of the data driving signal inputted through the data signal line;

a fourth stage, in which the low level signal is inputted through the first control signal line, the first transistor is turned off, the low level signal is inputted through the second control signal line, the second transistor is turned off, the low level signal is inputted through the third control signal line, the third transistor is turned off, charges on the capacitor are completely discharged, so that the voltage of the corresponding gate line becomes a low level, the switching elements in the row of pixel units corresponding to the gate line are switched off, and driving for the gate line is finished.

The present invention has following beneficial effects.

In the present invention of the array substrate, the first driving circuit is provided in the non-display area outside one side of the display area to drive all of gate lines and data lines on the array substrate, thus wiring on multiple sides of the array substrate is avoided, so that the array substrate can achieve no borders on sides thereof, other than the side provided with the first driving circuit, and can achieve a narrow border on the side provided with the first driving circuit.

The display device of the present invention adopts the above array substrate, thus can achieve a narrow border on the side provided with the first driving circuit and no borders on other sides thereof, and display resolution of the display device will not be reduced.

REFERENCE SIGNS 1, display area; 2, non-display area; 3, first driving circuit; 31, sub-circuit; 4, pixel unit; 5, data driving circuit; 6, peripheral circuit; 7, driving chip; 8, scan signal line.

DETAILED DESCRIPTION OF THE EMBODIMENTS

To provide better understanding of the technical solution of the present invention for those skilled in the art, an array substrate and a driving method for the same, and a display device provided by the present invention will be described in detail below in conjunction with the accompanying drawings and embodiments.

First Embodiment

Figure 1:
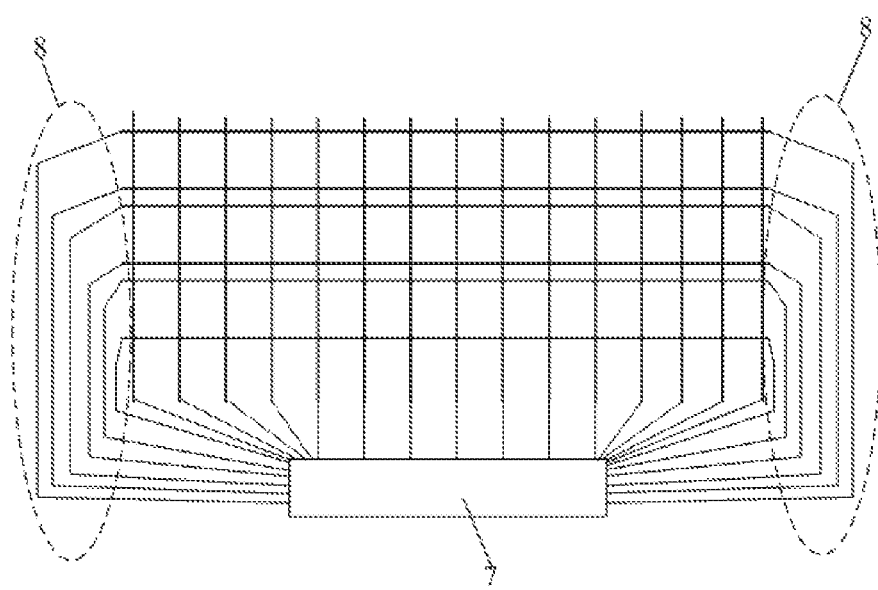
FIG. 1 is a schematic diagram of wiring on a display panel of prior art.
Figure 2:
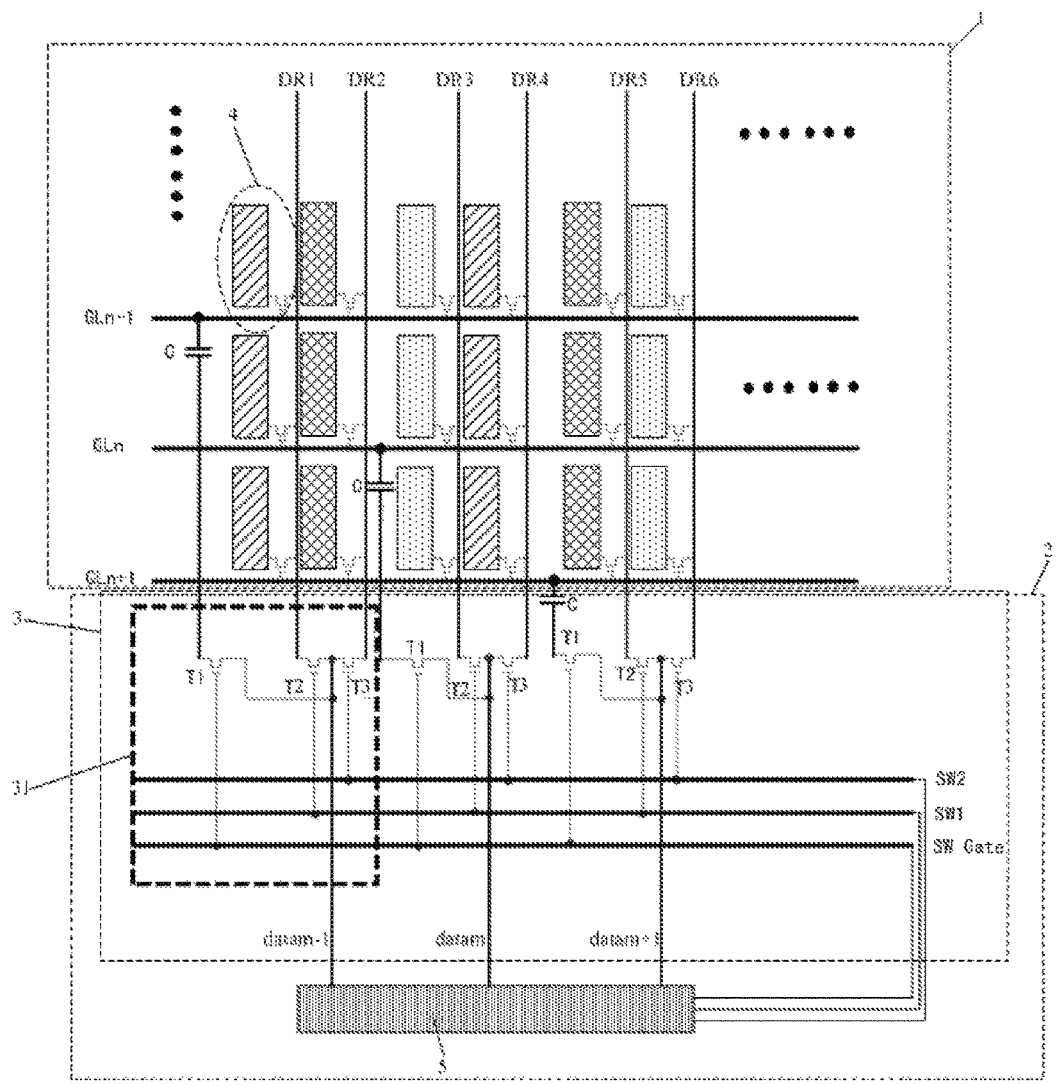
FIG. 2 is a circuit diagram of an array substrate in a first embodiment of the present invention.

The present embodiment provides an array substrate, as shown in FIG. 2, comprising pixel units 4 arranged in an array in a display area 1, a plurality of gate lines GL and a plurality of data lines DR, each of the gate lines is connected to a respective row of pixel units 4, and each of the data lines DR is connected to a respective column of pixel units 4. The array substrate further comprises a first driving circuit 3 provided in a non-display area 2 outside one side of the display area 1, the first driving circuit 3 is connected to each of the gate lines GL and each of the data lines DR respectively, for providing driving signals to the gate lines GL and the data lines DR.

By providing the first driving circuit 3 in the non-display area 2 outside one side of the display area 1 to drive all of the gate lines GL and the data lines DR on the array substrate, wiring on multiple sides of the array substrate is avoided, and the array substrate can achieve no borders on sides thereof, other than the side provided with the first driving circuit 3.

In the present embodiment, the first driving circuit 3 comprises a plurality of sub-circuits 31 with identical compositions and structures. Each of the sub-circuits 31 is connected to one of the gate lines GL and two of the data lines DR, and is configured to provide a scan driving signal to the respective one of the gate lines GL and provide a data driving signal to the respective two of the data lines DR.

In the present embodiment, the number of the sub-circuits 31 is the same as that of the gate lines GL, and is half of that of the data lines DR. With such configuration, each of the sub-circuits 31 can control two of the data lines DR simultaneously. When compared with a case of data lines DR being driven by a driving circuit one by one in the prior art, the space occupied by the driving circuit is greatly reduced, and the array substrate may have a narrower border. Meanwhile, with such configuration, display resolution of the array substrate will not be affected while wiring in the non-display area on the one side of the array substrate is reduced.

In the present embodiment, the sub-circuit 31 comprises a data signal line 'data', a first control signal line SW Gate, a second control signal line SW1, a third control signal line SW2, a first transistor T1, a second transistor T2, a third transistor T3 and a capacitor C, wherein agate of the first transistor T1 is connected to the first control signal line SW Gate, a first electrode of the first transistor T1 is connected to the data signal line 'data', a second electrode of the first transistor T1 is connected to a first terminal of the capacitor C, a second terminal of the capacitor C is correspondingly connected to one of the gate lines GL; a gate of the second transistor T2 is connected to the second control signal line SW1, a first electrode of the second transistor T2 is connected to the data signal line 'data', a second electrode of the second transistor T2 is correspondingly connected to the data line DR adjacent thereto; a gate of the third transistor T3 is connected to the third control signal line SW2, a second electrode of the third transistor T3 is connected to the data signal line 'data', and a first electrode of the third transistor T3 is correspondingly connected to the data line DR adjacent thereto.

With such configuration, each of the sub-circuit 31 can respectively perform a driving control for one of the gate lines GL and two of the data lines DR on the array substrate through the data signal line 'data' under control of the first control signal line SW Gate, the second control signal line SW1 or the third control signal line SW2, so that the entire array substrate performs display. Meanwhile, with such configuration, each of the sub-circuits 31 can control two of the data lines DR simultaneously, and when compared with a case of data lines DR being driven by a driving circuit one by one in the prior art, the space occupied by the driving circuit is greatly reduced, and the array substrate may have a narrower border.

In the present embodiment, the array substrate further comprises a data driving circuit 5. The data driving circuit 5 and the first driving circuit 3 are provided in the non-display area 2 outside the same side of the display area 1. The data signal line 'data', the first control signal line SW Gate, the second control signal line SW1 and the third control signal line SW2 are connected to the data driving circuit 5. The data driving circuit 5 is configured to provide a data driving signal to the data signal line 'data', and provide a control driving signal to the first control signal line SW Gate, the second control signal line SW1 and the third control signal line SW2. In the present embodiment, the data driving circuit 5 is implemented by a source driving chip, that is, the source driving chip provides the data driving signals to the data signal lines 'data', and also provides the control driving signals to the first control signal line SW Gate, the second control signal line SW1 and the third control signal line SW2, resulting in a greatly reduced space occupied by the data driving circuit 5 of the array substrate, which facilitates the array substrate to have a narrow border on one side thereof.

Based on above configuration of the array substrate in the present embodiment, the present embodiment also provides a driving method for the array substrate, comprising: driving the gate lines GL one by one through the first driving circuit 3. During driving any one of the gate lines GL, the first driving circuit 3 first drives half of pixel units 4 in the row of pixel units 4 corresponding to the gate line GL, and then drives the other half of pixel units 4 in the row of pixel units 4.

In the present embodiment, in a procedure of driving any one of the gate lines GL, the first driving circuit 3 first drives odd numbered pixel units 4 in the row of pixel units 4 corresponding to the gate line GL, and then drives even numbered pixel units 4 in the row of pixel units 4.

Figure 3:
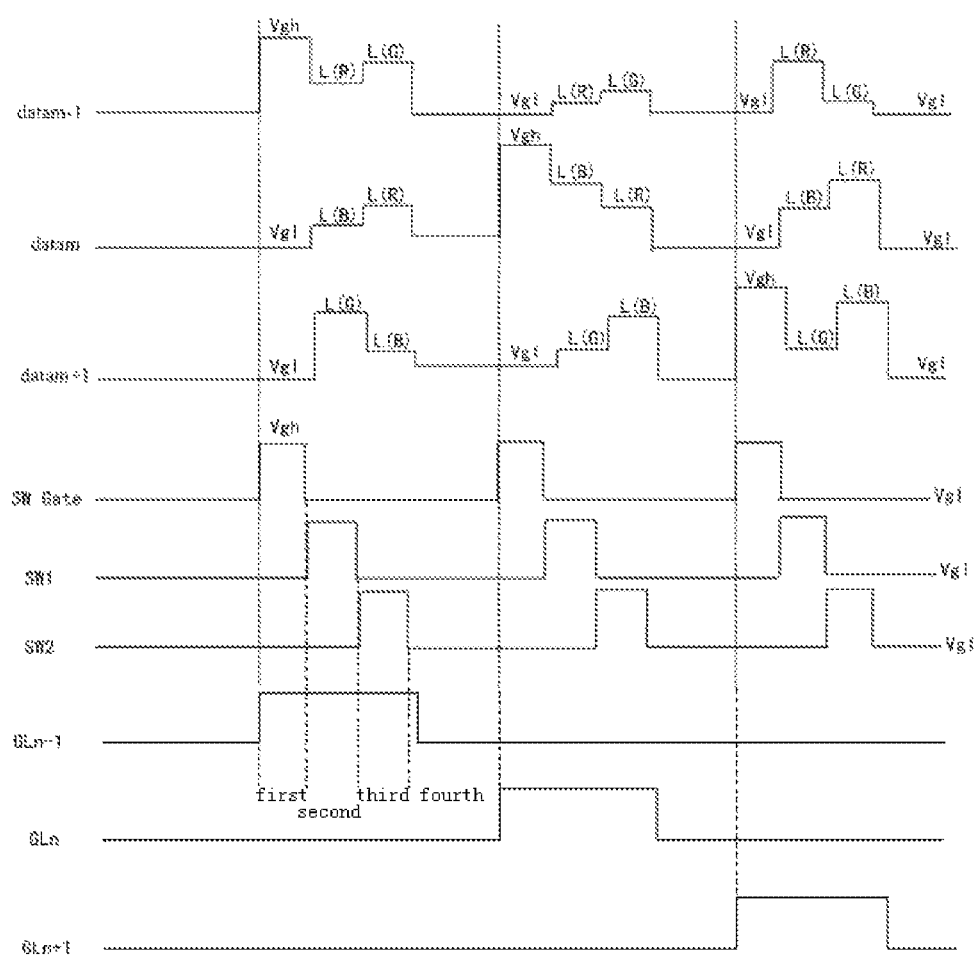
FIG. 3 is a timing diagram for driving the array substrate in FIG. 2.

In the present embodiment, as shown in FIG. 3, the procedure of driving any one of the gate lines GL specifically comprises following first through fourth stages, the procedure of driving the gate line GLn−1 is specifically illustrated below.

In a first stage, a high level signal Vgh is inputted through the first control signal line SW Gate, the first transistor T1 is turned on, and the capacitor C is charged by the data driving signal (a high level signal Vgh) inputted through the data signal line datam−1 (which correspondingly drives the gate line GLn−1 and the data lines DR1 and DR2); after completion of charging, a voltage of the corresponding gate line GLn−1 becomes a high level, switching elements in the row of pixels units 4 corresponding to the gate line GLn−1 are switched on, and the voltage of the gate line GLn−1 is maintained at the high level by the capacitor C in subsequent second and third stages.

In the first stage, since a low level signal Vgl as the data driving signal is inputted through the data signal lines (such as the data signal line datam and the data signal line datam+1) other than the data signal line datam−1, the gate lines (such as the gate line GLn and the gate line GLn+1) other than the gate line GLn−1 are pulled down to be reset, that is, when the gate line is scanned, the other gate lines are not scanned, thus the pixel units 4 arranged in an array on the array substrate are scanned row by row.

In a second stage, a low level signal Vgl is inputted through the first control signal line SW Gate, the first transistor T1 is turned off; a high level signal is inputted through the second control signal line SW1 the second transistor T2 is turned on, and sub-pixels in odd numbered pixel units 4 are correspondingly turned on by driving of the data driving signals inputted through the respective data signal lines.

In the second stage, the voltage of the gate line GLn−1 is maintained at the high level, that is, the gate line GLn−1 is enabled, the sub-pixels (e.g., red sub-pixels) in odd numbered pixel units 4 are correspondingly turned on by driving of the data driving signal L(R) inputted through the data signal line datam−1, the sub-pixels (e.g., blue sub-pixels) in odd numbered pixel units 4 are correspondingly turned on by driving of the data driving signal L(B) inputted through the data signal line datam, and the sub-pixels (e.g., green sub-pixels) in odd numbered pixel units 4 are correspondingly turned on by driving of the data driving signal L(G) inputted through the data signal line datam+1. That is, in the second stage, the sub-pixels in odd numbered pixel units 4 connected to the gate line GLn−1 illuminate light simultaneously.

In a third stage, the low level signal Vgl is inputted through the first control signal line SW Gate, the first transistor T1 is turned off; the low level signal is inputted through the second control signal line SW1, the second transistor T2 is turned off, the high level signal is inputted through the third control signal line SW2, the third transistor T3 is turned on, and sub-pixels in even numbered pixel units 4 correspondingly illuminate light by driving of the data driving signals inputted through the respective data signal lines.

In the third stage, the voltage of the gate line GLn−1 is maintained at the high level, that is, the gate line GLn−1 is enabled, the sub-pixels (e.g., green sub-pixels) in even numbered pixel units 4 are correspondingly turned on by driving of the data driving signal L(G) inputted through the data signal line datam−1, the sub-pixels (e.g., red sub-pixels) in even numbered pixel units 4 are correspondingly turned on by driving of the data driving signal L(R) inputted through the data signal line datam, and the sub-pixels (e.g., blue sub-pixels) in even numbered pixel units 4 are correspondingly turned on by driving of the data driving signal L(B) inputted through the data signal line datam+1. That is, in the third stage, the sub-pixels in even numbered pixel units 4 connected to the gate line GLn−1 illuminate light simultaneously.

In a fourth stage, the low level signal Vgl is inputted through the first control signal line SW Gate, the first transistor T1 is turned off; the low level signal is inputted through the second control signal line SW1, the second transistor T2 is turned off; the low level signal is inputted through the third control signal line SW2, the third transistor T3 is turned off; charges on the capacitor C are completely discharged, so that the voltage of the corresponding gate line GLn−1 becomes a low level, the switching elements in the row of pixel units 4 corresponding to the gate line GLn−1 are switched off, and driving for the gate line GLn−1 is finished.

It should be noted that, the duration of the fourth stage is short, or the duration of the fourth stage may be zero.

Other gate lines are scanned one by one in a manner similar to that for the gate line GLn−1, so that the entire array substrate is driven.

With the above driving method, the space for providing the first driving circuit 3 on one side of the array substrate is reduced, thus the array substrate can achieve a narrow border on the side provided with the first driving circuit 3, while display resolution of the array substrate will not be reduced.

It should be noted that, in the procedure of driving any one of the gate lines GL, the first driving circuit 3 may first drive even numbered pixel units 4 in the row of pixel units 4 corresponding to the gate line GL, and then drive odd numbered pixel units 4 in the row of pixel units 4. In this case, the gate of the transistor (e.g., the third transistor T3) in the sub-circuit 31 for controlling even numbered pixel units 4 in the above embodiment should be connected to the second control signal line SW1, and the gate of the transistor e.g., the second transistor T2) in the sub-circuit 31 for controlling odd numbered pixel units 4 in the above embodiment should be connected to the third control signal line SW2, the specific driving procedure is similar to the above, and will not be repeatedly described here.

Second Embodiment

Figure 4:
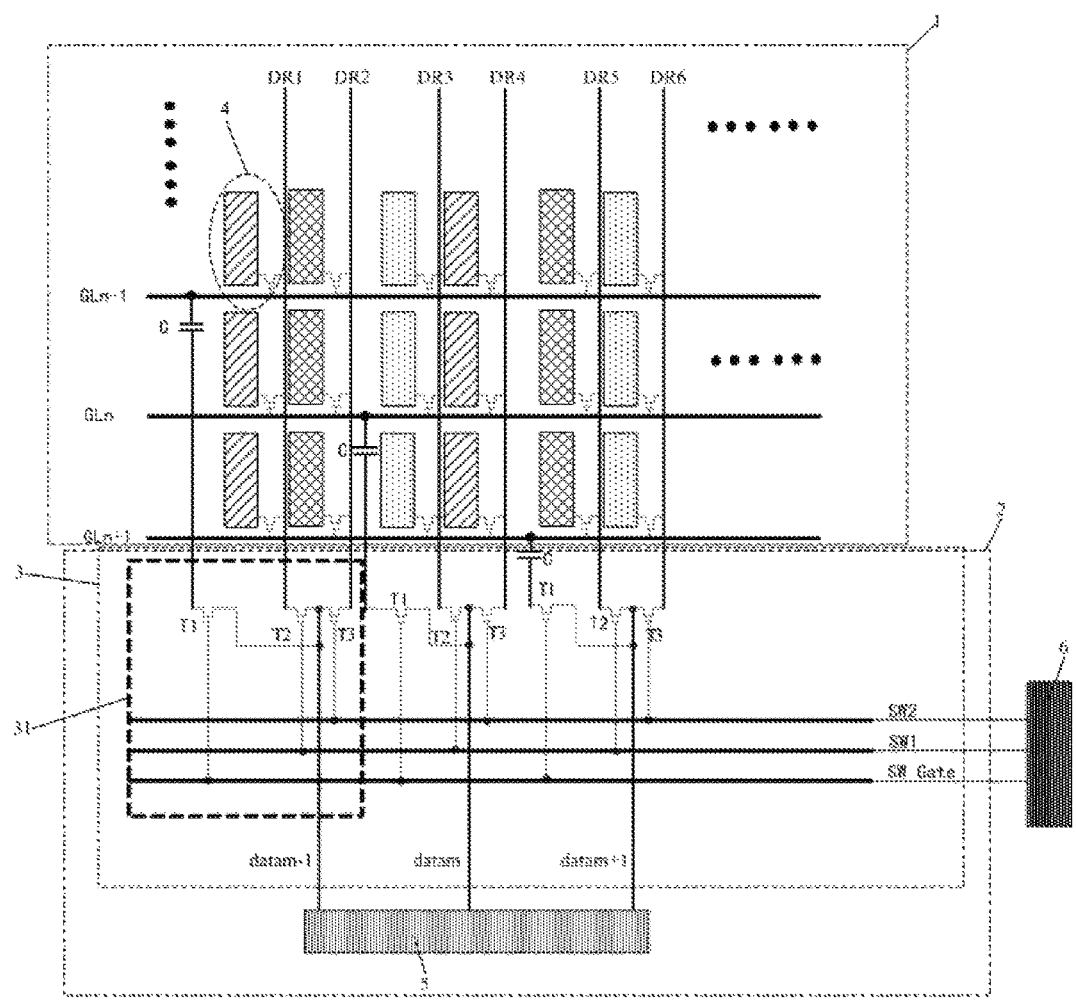
FIG. 4 is a circuit diagram of an array substrate in a second embodiment of the present invention.

The present embodiment provides an array substrate, which is different from that in the first embodiment in that, as shown in FIG. 4, the array substrate of the present embodiment comprises a data driving circuit 5 and a peripheral circuit 6, instead of only the data driving circuit 5 in the first embodiment. In the present embodiment, the data driving circuit 5 and the first driving circuit 3 are provided in the non-display area 2 outside the same side of the display area 1, the peripheral circuit 6 is provided outside the array substrate, wherein the first control signal line SW Gate, the second control signal line SW1 and the third control signal line SW2 are connected to the peripheral circuit 6, the peripheral circuit 6 is configured to provide a control driving signal to the first control signal line SW Gate, the second control signal line SW1 and the third control signal line SW2; the data signal line 'data' is connected to the data driving circuit 5, the data driving circuit 5 is configured to provide a data driving signal to the data signal line 'data'.

In the present embodiment, the data driving circuit 5 is implemented by a source driving chip, that is, the source driving chip provides the data driving signal to the data signal line 'data'. Since the first control signal line SW Gate, the second control signal line SW1 and the third control signal line SW2 are connected to the peripheral circuit 6 provided outside the array substrate, the space occupied by the data driving circuit 5 is further reduced, which facilitates the array substrate to have a narrow border on one side thereof.

Other structures of the array substrate and the driving method thereof in the present embodiment are the same as those in the first embodiment, and will not be repeatedly described here.

The first and second embodiments have following beneficial effects.

By providing the first driving circuit in the non-display area outside one side of the display area to drive all of gate lines and data lines on the array substrate, wiring on multiple sides of the array substrate is avoided, the array substrate can achieve no borders on sides thereof, other than the side provided with the first driving circuit, and can achieve a narrow border on the side provided with the first driving circuit.

Third Embodiment

The present embodiment provides a display device comprising the array substrate of any of the first and second embodiments.

The display device of the present embodiment adopts the array substrate of any of the first and second embodiments, thus can achieve a narrow border on the side provided with the first driving circuit and no borders on other sides thereof, and display resolution of the display device will not be reduced.

The display device of the present invention may be any product or member with display function, such as liquid crystal panel, liquid crystal television, display, OLED panel, OLED TV, phone, and navigator.

It could be understood that the above embodiments are exemplary embodiments used for describing the principle of the present invention only, but the present invention is not limited thereto. For those skilled in the art, various variations and modifications may be made without departing from the spirit and substance of the present invention, and these variations and modifications are considered as falling within the protection scope of the present invention.

The invention claimed is:

1. An array substrate, comprising pixel units arranged in an array in a display area, a plurality of gate lines and a plurality of data lines, each of the gate lines being connected to a respective row of pixel units, each of the data lines being connected to a respective column of pixel units, the array substrate further comprising a first driving circuit provided in a non-display area outside one side of the display area, the first driving circuit being connected to each of the gate lines and each of the data lines respectively, for providing driving signals to the gate lines and the data lines, wherein the first driving circuit comprises a plurality of sub-circuits with identical compositions and structures, each of the sub-circuits is connected to one of the gate lines and two of the data lines, and is configured to provide a scan driving signal to the respective one of the gate lines and provide a data driving signal to the respective two of the data lines, and wherein the sub-circuit comprises a data signal line, a first control signal line, a second control signal line, a third control signal line, a first transistor, a second transistor, a third transistor and a capacitor;

a gate of the first transistor is connected to the first control signal line, a first electrode of the first transistor is connected to the data signal line, a second electrode of the first transistor is connected to a first terminal of the capacitor, and a second terminal of the capacitor is correspondingly connected to the one of the gate lines;

a gate of the second transistor is connected to the second control signal line, a first electrode of the second transistor is connected to the data signal line, a second electrode of the second transistor is correspondingly connected to the data line adjacent thereto, a gate of the third transistor is connected to the third control signal line, a second electrode of the third transistor is connected to the data signal line, and a first electrode of the third transistor is correspondingly connected to the data line adjacent thereto.

2. The array substrate of claim 1, wherein the number of the sub-circuits is the same as that of the gate lines, and is half of that of the data lines.

3. The array substrate of claim 1, further comprising a data driving circuit, wherein the data driving circuit and the first driving circuit are provided in the non-display area outside the same side of the display area;

the data signal line, the first control signal line, the second control signal line and the third control signal line are connected to the data driving circuit, the data driving circuit is configured to provide a data driving signal to the data signal line, and provide a control driving signal to the first control signal line, the second control signal line and the third control signal line.

4. The array substrate of claim 1, further comprising a data driving circuit and a peripheral circuit, wherein the data driving circuit and the first driving circuit are provided in the non-display area outside the same side of the display area, and the peripheral circuit is provided outside the array substrate;

the first control signal line, the second control signal line and the third control signal line are connected to the peripheral circuit, the peripheral circuit is configured to provide a control driving signal to the first control signal line, the second control signal line and the third control signal line; the data signal line is connected to the data driving circuit, the data driving circuit is configured to provide a data driving signal to the data signal line.

5. A display device, comprising the array substrate of claim 1.

6. A driving method for the array substrate of claim 1, comprising:

driving the gate lines one by one through the first driving circuit, wherein during driving any of the gate lines, the first driving circuit first drives half of pixel units in the row of pixel units corresponding to the gate line, and then drives the other half of pixel units in the row of pixel units.

7. The driving method of claim 6, wherein in a procedure of driving any of the gate lines, the first driving circuit first drives odd numbered pixel units in the row of pixel units corresponding to the gate line, and then drives even numbered pixel units in the row of pixel units.

8. The driving method of claim 7, the procedure of driving any of the gate lines comprises:

a first stage, in which a high level signal is inputted through the first control signal line, the first transistor is turned on, the capacitor is charged by the data driving signal inputted through the data signal line, and after completion of charging, a voltage of the corresponding gate line becomes a high level, switching elements in the row of pixels units corresponding to the gate line are switched on, and the voltage of the gate line is maintained at the high level by the capacitor in subsequent second and third stages;

a second stage, in which a low level signal is inputted through the first control signal line, the first transistor is turned off, the high level signal is inputted through the second control signal line, the second transistor is turned on, and sub-pixels in odd numbered or even numbered pixel units are correspondingly turned on by driving of the data driving signal inputted through the data signal line;

a third stage, in which the low level signal is inputted through the first control signal line, the first transistor is turned off, the low level signal is inputted through the second control signal line, the second transistor is turned off, the high level signal is inputted through the third control signal line, the third transistor is turned on, and sub-pixels in even numbered or odd numbered pixel units are correspondingly turned on by driving of the data driving signal inputted through the data signal line;

a fourth stage, in which the low level signal is inputted through the first control signal line, the first transistor is turned off, the low level signal is inputted through the second control signal line, the second transistor is turned off, the low level signal is inputted through the third control signal line, the third transistor is turned off, charges on the capacitor are completely discharged, so that the voltage of the corresponding gate line becomes a low level, the switching elements in the row of pixel units corresponding to the gate line are switched off, and driving for the gate line is finished.

9. The driving method of claim 6, wherein in a procedure of driving any of the gate lines, the first driving circuit first drives even numbered pixel units in the row of pixel units corresponding to the gate line, and then drives odd numbered pixel units in the row of pixel units.

10. The driving method of claim 9, the procedure of driving any of the gate lines comprises:

a first stage, in which a high level signal is inputted through the first control signal line, the first transistor is turned on, the capacitor is charged by the data driving signal inputted through the data signal line, and after completion of charging, a voltage of the corresponding gate line becomes a high level, switching elements in the row of pixels units corresponding to the gate line are switched on, and the voltage of the gate line is maintained at the high level by the capacitor in subsequent second and third stages;

a second stage, in which a low level signal is inputted through the first control signal line, the first transistor is turned off, the high level signal is inputted through the second control signal line, the second transistor is turned on, and sub-pixels in odd numbered or even numbered pixel units are correspondingly turned on by driving of the data driving signal inputted through the data signal line;

a third stage, in which the low level signal is inputted through the first control signal line, the first transistor is turned off, the low level signal is inputted through the second control signal line, the second transistor is turned off, the high level signal is inputted through the third control signal line, the third transistor is turned on, and sub-pixels in even numbered or odd numbered pixel units are correspondingly turned on by driving of the data driving signal inputted through the data signal line;

a fourth stage, in which the low level signal is inputted through the first control signal line, the first transistor is turned off, the low level signal is inputted through the second control signal line, the second transistor is turned off, the low level signal is inputted through the third control signal line, the third transistor is turned off, charges on the capacitor are completely discharged, so that the voltage of the corresponding gate line becomes a low level, the switching elements in the row of pixel units corresponding to the gate line are switched off, and driving for the gate line is finished.

\* \* \* \* \*